United States Patent [19]

Nicksic

[11] Patent Number: 4,670,157
[45] Date of Patent: * Jun. 2, 1987

[54] PROCESS FOR CLARIFYING BICARBONATE BEARING WATER USING MEASUREMENT AND CONTROL OF CARBON DIOXIDE CONTENT

[75] Inventor: Stephen W. Nicksic, Brea, Calif.

[73] Assignee: The Phoenix Project Partnership, Larkspur, Calif.

[*] Notice: The portion of the term of this patent subsequent to Jan. 7, 2003 has been disclaimed.

[21] Appl. No.: 782,411

[22] Filed: Oct. 2, 1985

Related U.S. Application Data

[63] Continuation of Ser. No. 580,443, Feb. 15, 1984, Pat. No. 4,563,283.

[51] Int. Cl.$^4$ .............................................. C02F 5/08
[52] U.S. Cl. .................................. 210/696; 166/266; 210/703; 210/709; 210/712; 210/743
[58] Field of Search ................ 73/61 R; 166/266–268, 166/304; 210/703, 706, 709, 712, 718, 739, 743, 696, 96.1

[56] References Cited

U.S. PATENT DOCUMENTS

| | | | |
|---|---|---|---|
| 2,230,001 | 1/1941 | McConnell et al. | 166/268 |
| 2,398,123 | 4/1946 | Sowers | 166/268 |
| 2,766,203 | 10/1956 | Brown et al. | 210/706 |
| 2,875,833 | 3/1959 | Martin | 166/268 |
| 3,262,877 | 7/1966 | Le Compte, Jr. | 210/712 |
| 3,419,493 | 12/1968 | Pangle, Jr. | 210/706 |
| 3,782,468 | 1/1974 | Kuwada | 166/267 |
| 4,277,343 | 7/1981 | Paz | 210/709 |
| 4,444,675 | 4/1984 | Goeldner | 210/696 |
| 4,472,283 | 9/1984 | Brooks | 210/698 |
| 4,563,283 | 1/1986 | Nicksic | 210/712 |

FOREIGN PATENT DOCUMENTS 52-44559 11/1977 Japan .................................. 210/743

Primary Examiner—Peter Hruskoci
Attorney, Agent, or Firm—George W. Wasson

[57] ABSTRACT

This invention relates to a process for achieving and maintaining the clarity of bicarbonate bearing waters. The process has application to treating bicarbonate bearing waters where such waters are for injection into a subsurface formation, for waste disposal, or for any other industrial purpose where bicarbonate bearing waters may need to be treated. The process is intended to prevent an imbalance in the bicarbonate/carbonate equilibria in bicarbonate containing waters as the water is treated in a treatment process. The process involves the measurement and control of carbon dioxide content to prevent the deposition of both organic and inorganic solids. By use of the process the specifications on turbidity and suspended solids content in treated water can be met with a significant decrease in, or possibly elimination of, the dosage of other treating chemicals.

1 Claim, 2 Drawing Figures

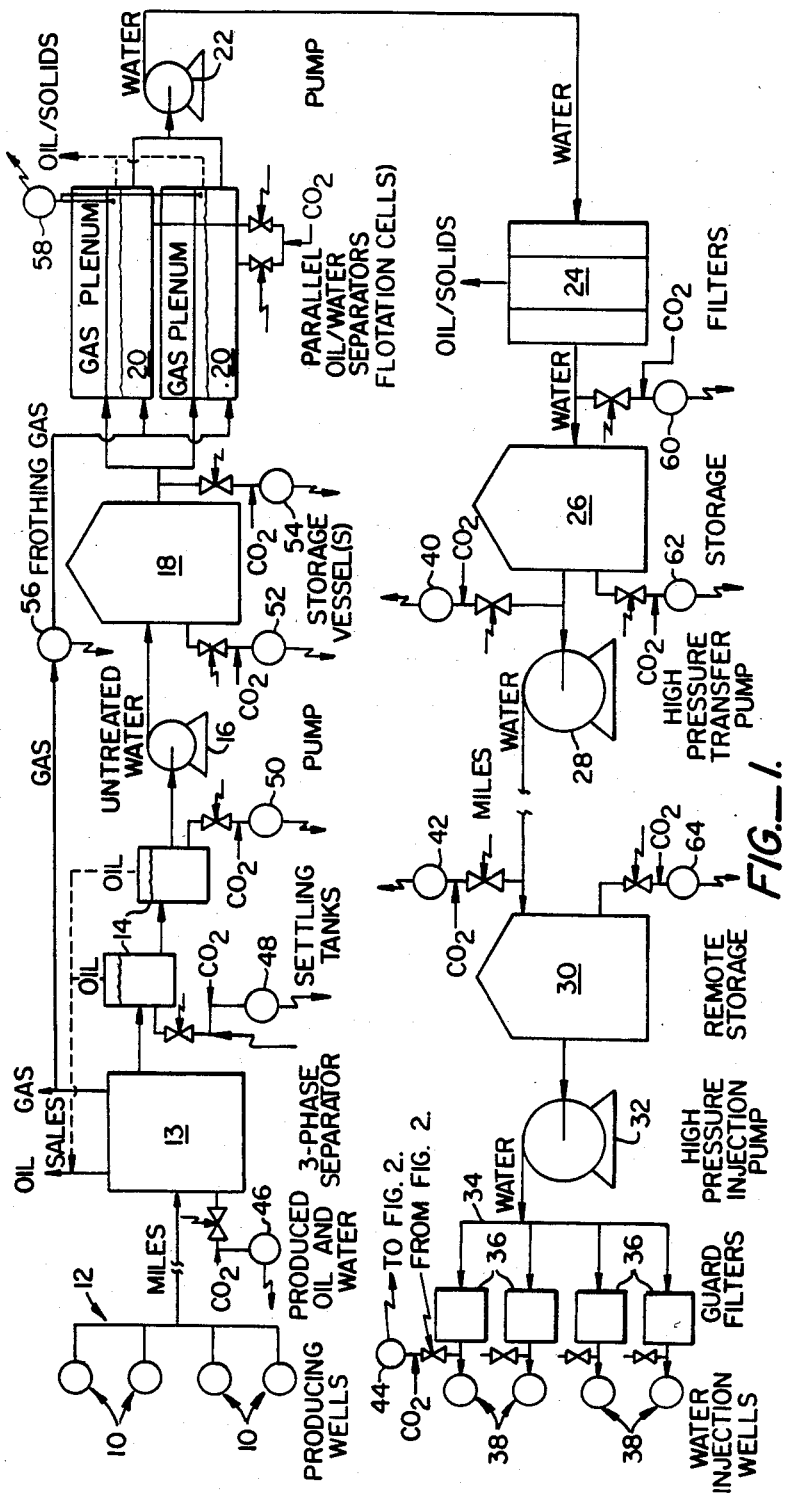
FIG._1.
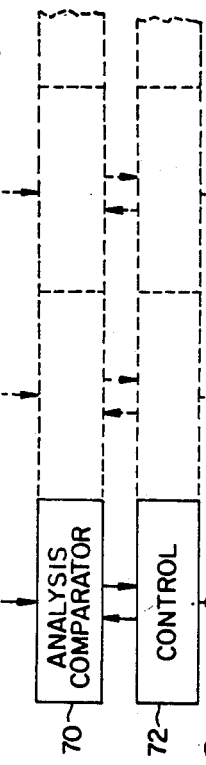
FIG._2.

PROCESS FOR CLARIFYING BICARBONATE BEARING WATER USING MEASUREMENT AND CONTROL OF CARBON DIOXIDE CONTENT

This application is a continuation of application Ser. No. 580,443, filed Feb. 15, 1984 now U.S. Pat. No. 4,563,283.

FIELD OF THE INVENTION

This invention relates to a process for achieving and maintaining the clarity of bicarbonate bearing waters. The process has application to treating bicarbonate bearing waters where such waters are for injection into a subsurface formation, for waste disposal, or for any other industrial purpose where bicarbonate bearing waters may need to be treated. The process is intended to prevent an imbalance in the bicarbonate/carbonate equilibria in bicarbonate containing waters as the water is treated in a treatment process. The process involves the measurement and control of carbon dioxide content to prevent the deposition of both organic and inorganic solids. By use of the process the specifications on turbidity and suspended solids content in treated water can be met with a significant decrease in, or possibly elimination of, the dosage of other treating chemicals.

An objective of this invention is to maintain water clarity specifications throughout the processing, storage, distribution, and injection or disposal system by a simpler, more effective and lower cost process. This invention specifically addresses the common problem of "post-precipitation," or reappearance of turbidity and deposits in the filtered water after it has been processed in a treating facility such as an oil field oil/water separator (flotation cell) or other filter system. Waters treated in accord with the present invention can be used in a waterflood process and can eliminate or significantly reduce the scaling of injection wells and plugging of the subsurface formation into which the treated water is injected.

Another objective of this invention is to achieve good water quality without substantially altering or adding to existing water treating facilities used in water injection processes. The process of the present invention eliminates the need for some system components, decreases filter capacity requirements, increases water throughput capacity, reduces maintenance, and can reduce or eliminate the need for expensive chemicals now frequently added in various stages of the water treatment process commonly used in oil production operations.

BACKGROUND OF THE INVENTION

Initial production of petroleum from subsurface reservoirs, referred to as primary production, frequently is accompanied by produced water (brine). The produced water must be separated from the oil and discarded or otherwise disposed of. Frequently the separated produced water is pressure injected into the same or another oil reservoir with the intention of increasing oil recovery from the reservoir. Such a reinjection process is referred to as a secondary recovery process with subsequent treatment processes referred to as tertiary processes. During primary oil recovery, the oil/water ratio in produced fluids is typically one part water to three parts of oil. During secondary and tertiary oil recovery, the water content in the produced fluids frequently increases to an oil/water ratio of fifty or more parts water to one part oil until continued production is no longer economically viable.

For water to be satisfactorily injected into a reservoir whether for purposes of disposal or improved oil recovery, the water should be sufficiently "clean" to enter the subsurface formation (a porous medium) without causing formation plugging. If the subsurface formation becomes plugged, progressively higher water injection pressures may be required to maintain a desired injection volume. At some point, the fracture pressure of the formation can be reached resulting in possible fracturing of the formation. If fracturing occurs the resulting "thief zone" in the fractured formation can establish low resistance paths through the formation that can steal most of the injection water. The result is a poor injection profile and the bypassing of formation oil which might have been captured in secondary or tertiary recovery. Furthermore, subsequent plugging of a "thief zone" is costly, difficult and often impossible.

Deposition of solids in the porous subsurface formation and on the face of the injection wellbore from injection waters may result in the need for an injection well "workover" or a stimulation of some kind within the formation. Processes such as mechanical scraping and bailing, acidizing, solvent washing and various combination treatments can be used but such processes are very expensive. In some cases an expensive sidetrack well may be drilled. In other instances, the original well can only be abandoned. A substantial economic incentive exists, therefore, to provide clean (solids-free) water for injection into the subsurface formation in a water injection process to avoid formation damage.

Water filtration equipment is affected by the cleanliness or the water separated from the produced fluids. Poor water clarity, whether due to inadequate filtration or the post-precipitation of solids, also causes severe problems in other surface facilities. In the surface facilities of oil field equipment, inorganic deposits (scale), coated by gelatinous solids, frequently called organic slime, often adhere to the internal surfaces of filters, pumps valves, storage tanks, and distribution pipelines. When these surface facilities become clogged the equipment must be shut down and cleaned. This introduces costly downtime and maintenance expenses. "Pigging" (mechanical internal reaming) of pipelines is sometimes required to maintain pipeline capacity.

Water quality is also affected by system upsets which occur with surges of oil flowing into the surface water treating equipment, seemingly at random periods, requiring frequent change of filter media and/or frequent filter backwashing cycles.

It is also known that oil well scale in the form of carbonate scale depositions is due to the loss of carbon dioxide from bicarbonate bearing waters. The petroleum industry has struggled with carbonate scale deposition and has generally attacked the problem by the addition of scale inhibiting chemicals, acidizing techniques, and various types of filters in series. None of these approaches have been directed toward the source of the problem; i.e., the loss of carbon dioxide from bicarbonate bearing waters.

Several recent changes have introduced new considerations to oil production and oil field water treatment in which carbonate-bicarbonate chemistry is involved. These changes include:

1. Production of Heavy Oil

Because lighter more easily refined crude oils are being depleted throughout the world, production of heavy, viscous crude oils is increasing rapidly. Heavy crude oils make the separation of oil from water more difficult, due in part to surface active components (organic acids) prevalent in these oils. When produced water loses pressure in surface facilities there is an increase in pH (higher alkalinity) resulting from loss of carbon dioxide. Carbonate scale begins to form increasing the tendency to drag organic matter into the water. This organic matter frequently is adsorbed onto inorganic solids which have precipitated from the water. The result is a composite gelatinous slime which is extremely difficult to remove by filtration.

2. Stringent Regulations For Waste Water Disposal

These regulations combined with the above change have required the extensive use of flotation cells to remove more oil from the produced water.

3. Methane (Natural Gas) As Frothing Gas in Flotation Cells

Since methane is usually readily available at a producing well, it is commonly used as as frothing gas in flotation cells in oil producing operations to remove additional suspended solids and traces of oil. Methane, however, causes a stripping or loss of dissolved carbon dioxide. This loss of carbon dioxide shifts the chemical equilibrium toward higher pH level and toward the formation of carbonates. Therefore the use of methane gas in water treatment process can be counterproductive to improving water clarity.

4. Large Central Treating Facilities

Centralized facilities require produced fluids to be pipelined over considerable distances, sometimes many miles. At the centralized facility the oil and water are separated, the water is clarified and finally the clarified water is returned to injection wells. The longer time, increased distances and greater storage (tankage) requirements allow more carbon dioxide to escape from the water aggravating the problem of solids precipation. Additionally, more and greater pressure changes frequently occur in large central facilities than in smaller field units. Such changes in system pressure are also conducive to the escape of carbon dioxide from the water being treated.

UNDESIREABLE RESULTS FROM LOSS OF CARBON DIOXIDE

Typical oil field waters contain chlorides and sulfates of alkali and alkaline earth metals. These are stable compounds mostly unaffected by changes in system pressure. Instability occurs when produced water contains a mixture of bicarbonates and divalent metal ions particularly calcium, magnesium, and iron. The loss of carbon dioxide from the produced water treatment system causes insoluble carbonates to form as shown by the equilibria in the following chemical equations:

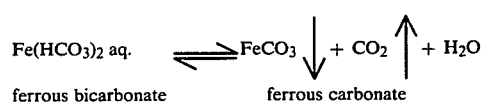

ferrous bicarbonate       ferrous carbonate

-continued

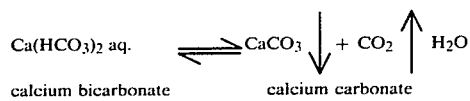

calcium bicarbonate       calcium carbonate

Note:
Both equilibria are pressure sensitive. Carbon dioxide loss has a unique chemical effect in displacing the equilibria toward the insoluble carbonates.

If carbon dioxide escapes due to lowered system pressure, or due to the stripping action of methane in flotation cells, the equiblibria are driven to the right (in the direction of insoluble iron and alkaline earth carbonates) in accordance with established chemical principles. Conversely, pressuring the system with carbon dioxide drives the equilibria to the left, i.e. in the direction of soluble iron and alkaline earth bicarbonates. This explains the unique beneficial effect of maintaining the concentration of dissolved carbon dioxide under pressure (whether by addition of carbon dioxide and/or the prevention of its escape). If carbon dioxide is added to the system, it reacts with water to form carbonic acid as shown in the following chemical equation:

$$CO_2 \text{ (gas)} + H_2O \rightleftharpoons H_2CO_3$$

carbonic acid

The tendency of carbon dioxide to escape from otherwise pure water is very much stronger than from bicarbonate bearing water as illustrated by the length of the arrows in the above equation.

Controlling the carbon dioxide content is especially important in cases (as in California waters) where ferrous bicarbonate is present. This is because ferrous bicarbonate has a strong tendency to form hydrous ferrous oxide by way of the intermediate, hydroxy carbonate. These compounds scavenge the small (parts per billion) quantities of oxygen and are oxidized to hydrous ferric oxide. The hydrous ferrous and ferric hydroxides are gelatinous solids, which rapidly clog filters and other equipment. They also provide sites for the adsorption of an impervious film of organic matter which can aggravate the clogging problem. The following chemical equations apply:

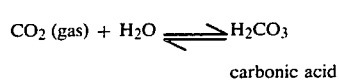

ferrous bicarbonate

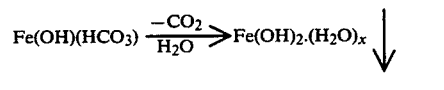

hydrous ferrous hydroxide

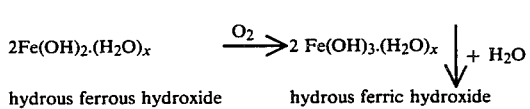

hydrous ferrous hydroxide    hydrous ferric hydroxide

In a properly designed and operated facility, the amount of molecular oxygen (air) entering the system is very small. The conversion of ferrous iron to ferric iron is usually low. The adsorption of organic matter onto hydrous iron oxides is a major source of the gelatinous solids or organic slime found in oil field water treatment systems.

ORGANIC ACID PROBLEM

There is a little recognized, but easily demonstrable compounding effect of insufficient carbon dioxide in a filtration system. It is shown by the following equation involving the solubilizing of organic acids especially prevalent in heavy crude oils:

$$RCOOH + OH^- \xrightarrow{H_2O} RCOO^- + H_2O$$

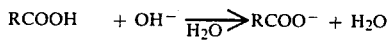

In this reaction the oil soluble (but water insoluble) organic acid is converted to the water soluble (or water dispersible) salt of the organic acid. Hydroxide ion concentration increases when carbon dioxide escapes from the system (with increasing pH). Thus it is shown that the loss of carbon dioxide not only causes precipitation of inorganic solids (carbonate and hydroxide scale), but it is also a factor which affects the amount of organic matter available for adsorption onto the inorganic solids as a gelatinous organic slime.

METHANE IN FLOTATION CELLS

Methane's primary function in flotation cells is to introduce a frothing action for the collection and removal of oil and solids. Unfortunately, methane also very effectively strips out carbon dioxide, even though it is not added for that purpose. That is an undesirable effect as will be seen in the description of the present invention which follows.

DESCRIPTION OF THE PRIOR ART

The chemistry of carbon dioxide in water solutions containing alkali and alkaline earth metals is readily available in standard textbooks on inorganic chemistry. Quantitative analysis textbooks contain a comprehensive treatment of the subject. Few chemical equilibria play so widespread and important a role in nature as do the aqueous carbonate equilibria referred to in the description of the present invention. What is lacking in the prior art is the practical appreciation for the role which carbon dioxide partial pressure plays in these equilibria. Reference is made to the paper by F. N. Ponnamperuma, "A Theoretical Study Of Aqueous Carbonate Equilibria" published in Soil Sciences, Volume 100, pp 90–100 (1967). In this paper the role of carbon dioxide partial pressure in various solutions is defined by equations. Yet the novel process of the present invention cannot be derived from the Ponnamperuma paper.

A paper by R. M. Gray, Jr. "Oil Field Filtration" given at the 1964 meeting on Microbiology in Anaheim, Calif. describes the water quality problem and the importance of effective filtration in supplying clean injection water in the oil field.

U.S. Pat. No. 2,230,001 issued Jan. 28, 1941 to McConnell and Steadman recognizes the precipitation of carbonates from formation waters when carbon dioxide is released, and recommends a closed filtration system keeping the flooding water under pressure to avoid loss of carbon dioxide. That patent does not cover the case, as herein described, where the pressure cannot be maintained due to flotation cells, nor does it disclose a solution to the vexing gelatinous organic slime problem.

U.S. Pat. No. 2,398,123 issued Apr. 9, 1946 to Sowers describes the formation of precipitates due to the loss of dissolved gases as a result of bringing subsurface water to the surface of the ground and suggests gas blanketing of the water pumped from a water well to the injection well to prevent the escape of gases. That patent also recognizes that blanket gas can be used to maintain the pH at a sufficently low figure.

The present invention and the foregoing patents should not be confused with carbon dioxide flooding processes used in petroleum production. U.S. Pat. No. 2,875,833 issued Mar. 3, 1959 to Martin is one example of many patents that discuss the use of carbon dioxide and water to obtain increased oil recovery. The amount of carbon dioxide used and the method of application are quite different when the objective of the process is to extract oil from formation pores, instead of avoiding deterioration of produced waters intended for use in water flooding. The purpose of citing the Martin patent is to point out that numerous carbon dioxide flooding patents for increasing oil recovery have been issued.

SUMMARY OF THE PRESENT INVENTION

The present invention is a novel process developed for water treatment systems. The process is particularly useful in oil field applications when flotation cells are used. The process is also applicable in the absence of flotation cells and in other environments where water treatment is required. The steps of the process are:

1. Measure the concentration of carbon dioxide and the pH of the water under prescribed conditions at various key sample points throughout the system. This measurement indicates (by difference in values) where carbon dioxide is escaping, and how much carbon dioxide must be injected at critical points in the water treatment system to compensate for escaped carbon dioxide.
2. Measure the concentration of carbon dioxide in the flotation cell frothing gas (usually methane or natural gas). This measurement is used to adjust operating parameters and to select appropriate treating chemicals to minimize the amount of carbon dioxide being stripped out of the water by the frothing gas.
3. Replace the frothing gas, wholly or in part, with carbon dioxide to maintain the desired level at the various sampling points.
4. Adjust the carbon dioxide at each sampling point to a slight effects over the measured amount in incoming water, if the pH of the effluent water is higher than the initial or desired pH. An excess sufficient to create a separate gas phase should be avoided because it may cause cavitation erosion.
5. Maintain oxygen-free water throughout the water treatment system to provide a "low-corrosion" system. Closing the system to prevent carbon dioxide losses makes oxygen exclusion much easier to accomplish.

The expected benefits of operating a water treatment system in accord with the present invention comprise:
1. Reduced filter system facility requirements.
2. Increased water throughput capacity.
3. Alleviation of injection well formation plugging.
4. Compliance with produced fluid discharge requirements.
5. Elimination of some maintenance of surface pipelines.
6. Easier acidification of injection wells, if needed.

7. Less overall maintenance and equipment downtime.
8. Lower cost of oil recovery.
9. Elimination of equipment and reduction or elimination of treating chemical use from some existing facilities.

Further objects and features of the present invention will be readily apparent to those skilled in the art from the appended drawings and specification illustrating a preferred embodiment wherein:

FIG. 1 is a schematic flow diagram of a water treatment system facility wherein the present invention is applied.

FIG. 2 is a block diagram of an analysis/comparator and control system useful with the present invention.

BRIEF DESCRIPTION OF THE DRAWINGS

FIG. 1 is a simplified diagram illustrating a large central oil field water treating facility employing the process of the present invention. Producing wells are illustrated at 10 with production joined and transported through pipelines, as at 12 to a three phase separator 13. Oil and gas are separated by well known processes and removed for sale or storage. The remaining water flows or is pumped into one or more settling tanks 14 where additional oil is separated and collected with the previously separated oil. The remaining untreated water is then pumped, by pump 16, from the settling tanks 14 to one or more storage vessels 18. The water is then processed in one or more oil/water flotation cell separators 20 where a frothing action occurs to remove traces of gas, oil and suspended solids from the water being treated. The gas is collected with other separated gas and the oil/solids are collected for further disposition. The treated water is then pumped by pump 22 to one or more filters 24 and sent to storage 26. The treated water is pumped by pump 28, often many miles, to remote storage 30, and pumped by pump 32 into distribution pipelines 34 and through guard filters 36 for injection into subsurface formations through injection wells 38.

For this invention, water quality tests are conducted at points 40, 42 and 44. Measurements of carbon dioxide are undertaken at points 46, 48, 50, 52, 54, 56, 58, 60, 62, and 64 with valving at each measuring point to permit introduction of carbon dioxide from a suitable source (not shown in FIG. 1).

FIG. 2 is a simplified block diagram of an analysis/comparator and control system for use with the present invention. As illustrated, an analysis/comparator 70 receives measurement or test signals from the measurement or test points of FIG. 1 and performs the desired or necessary comparisons, as prescribed in accord with the present invention, and supplies a signal to control 72 where the desired control signal is generated. The control 72 supplies the control signal to valving and/or carbon dioxide introduction points of FIG. 1 to accomplish the desired control of the particular portion of the water treatment system. A feedback signal is shown from the control 72 to the analysis/comparator, as is usual in control systems, to provide a signal indicating to the receiving circuit the control signal that has been generated. The elements of FIG. 2 may be separate elements for each of the facilities of the treatment system, as suggested by the blocks shown in phantom to the right of elements 70 and 72, or a suitably programmed set of elements can perform the desired comparison and control functions on a time shared basis. Because the actual design of the elements forms no part of the present invention and because many forms of measurements (electrical, pneumatic, hydraulic, etc.) may be used, the elements are shown only as blocks of a block diagram.

DETAILED DESCRIPTION OF THE INVENTION

The invention is described by giving operating instructions for measuring, adding and controlling carbon dioxide. As shown in the system diagram, two useful analytical tests for carbon dioxide (although other analytical tests for carbon dioxide may be used) are used. The two tests are:

1. Determination of gas-phase carbon dioxide by means of a nondispersive infrared analyzer capable of high sensitivity and equipped for continuous recording; and
2. A measurement of "strippable" carbon dioxide. This is the amount of carbon dioxide that can be removed by a stream of nitrogen from a given volume of water under prescribed conditions. Carbon dioxide stripped from water can be measured by scrubbing the nitrogen stream in a coulometric cell in which hydroxide ion is electrically generated in a manner that expresses the generating current as carbon dioxide equivalent.

Details of these two tests are known to experienced analytical chemists. Other techniques are known and could be used in the process of the present invention.

It is neither necessary to follow the instructions below in the order given, nor will it always be necessary to perform all of the operations. It is preferrable to perform only those operations needed to provide a "strippable carbon dioxide" value, at the final sampling point 64, equal to or slightly greater than the value at the first sampling point 48. A large excess of carbon dioxide is undesirable because it can drive the pH of the treated water down far enough for aggressive corrosion to occur. An excess large enough to create a separate gas phase under process conditions can cause cavitation erosion in the treatment facilities.

The following is a preferred sequence of measurements, together with corrective actions, for application of the invention to the process diagrammed in FIG. 1.

1. Measure and compare the gas phase concentration of carbon dioxide at points 56 and 58. If the value is higher at 58 than that at 56, carbon dioxide is being stripped from water by the flotation cell frothing gas. These measurements are a guide to the selection of treating chemicals and operation parameters to minimize escape of carbon dioxide.
2. Measure and compare "strippable carbon dioxide" at points 48 and 54. A lower value at 54 than that measured at 48 will indicate the need for blanketing with carbon dioxide in settling tanks 14 and in storage vessel 18. In accord with the process of the present invention a slight excess pressure of carbon dioxide should be maintained in vessel 18.
3. Measure and compare "strippable carbon dioxide" at points 54 and 46. Replace the methane gas portion of the frothing gas with carbon dioxide in flotation cells 20, wholly or in part, as needed, to maintain an equal or higher value of strippable carbon dioxide at measurement point 56.
4. Measure and compare "strippable carbon dioxide" at points 40, 42, 44 and 60 to determine the need for carbon dioxide blanketing in storage vessel 26 and 30. Perform water quality tests at points 40, 42 and 44 for confirmation, and for determining the need to inject additional carbon dioxide at any or all sample points within the system.

Additional diagnostic information regarding the precipitation of unwanted carbonates or the formation of gelatinous organic slime can be obtained from pressure drop measurements at various stations in the system and from the record of filter back-washing and/or filter cartridge changes.

It is recommended that carbon dioxide addition be made with a suitable dispensing apparatus and under conditions for precise control of the amounts added independent of system pressure at point of addition of the carbon dioxide. For example, carbon dioxide may be added to the three phase separator 13 or the settling tanks 14 at slightly above atmospheric pressure, whereas the addition of carbon dioxide at the injection wells will require a source at a much higher pressure. In both injection points it is desirable to provide the precise control at the existing pressure. Suitable apparatus to perform the desired injection is available and should be used.

Throughout this specification there has been reference to maintaining a blanket of excess of carbon dioxide over that originally present in the input or treated water. The excess in pressure of carbon dioxide is intended to be in the range of a slight excess to as much as an excess of the pounds per square inch.

Practice of the invention for other liquid treatment facility designs can be inferred by those skilled in the art from the discussions and procedures stated above for the system and facilities shown in FIG. 1. While a certain preferred embodiment of the invention has been specifically disclosed, it should be understood that the invention is not limited thereto as many variations will be readily apparent to those skilled in the art and the invention is to be given its broadest possible interpertation within the terms of the following claims.

I claim:

1. In a water treatment process for the treatment of bicarbonate bearing produced waters from a subsurface earth formation with surface water treatment facilities comprising at least a three phase (gas/oil/water) separator and a flotation (oil/water/solid) cell at the surface of said earth formation designed to create treated waters from said produced water for reinjection into said subsurface earth formation through an injection well, said surface water treatment facilities, said subsurface injection well and the subsurface injection formation being subject to possible damage by precipitation of gelatinous organic and inorganic solids from said treated waters originating from an imbalance in the bicarbonate/carbonate equilibria in said treated waters during said treatment and reinjection into said subsurface earth formation, the method of operating said water treatment process to avoid said imbalance in said bicarbonate/carbonate equilibria comprising;

(a) measuring the gas phase carbon dioxide level of the bicarbonate bearing produced waters and measuring the pH of said produced waters at the input to said surface water treatment facilities to determine the initial bicarbonate/carbonate equilibria of said produced water at the input to said surface water treatment facilities, (b) measuring the gas phase carbon dioxide level of the treated waters and measuring the pH of said treated waters throughout said surface water treatment facilities to identify any change in said gas phase carbon dioxide level which change could cause an imbalance in said bicarbonate/carbonate equilibria in said treated waters, (c) and controlling said measured gas phase carbon dioxide level throughout said treatment facilities by addition of sufficient gas phase carbon dioxide to control said pH throughout said surface water treatment facilities and to establish an excess of carbon dioxide within said treated water throughout said surface water treating facilities to prevent precipitation of said gelatinous organic or inorganic solids from said treated water in said treatment facilities and injection well resulting from an imbalance of said determined initial bicarbonate/carbonate equilibria.

* * * * *